United States Patent

Grafius

[15] 3,655,042

[45] Apr. 11, 1972

[54] PARTS GAGER

[72] Inventor: Gerald R. Grafius, Erie, Pa.

[73] Assignee: Automatic Devices, Inc., Fairview, Pa.

[22] Filed: Dec. 1, 1970

[21] Appl. No.: 94,121

[52] U.S. Cl. ................................................. 209/91, 209/96
[51] Int. Cl. ............................................................ B07b 13/04
[58] Field of Search ............................... 209/73, 90, 91, 96

[56] References Cited

UNITED STATES PATENTS

| | | | |
|---|---|---|---|
| 2,339,638 | 1/1944 | Henszey et al. | 209/90 X |
| 2,716,487 | 8/1955 | Cox | 209/91 |
| 3,587,850 | 6/1971 | Dick | 209/73 |

*Primary Examiner*—Allen N. Knowles
*Attorney*—Dominik, Knechtel & Godula

[57] ABSTRACT

Disclosed is a parts gager which is made up of a vibratory bowl feeder which delivers parts to a rotating gage wheel having a wedge face and a slotted interior portion. The gage wheel receives those parts which are oversized, bent, doubled, or otherwise unacceptable and carries the same to a reject chute; failing to accept those parts which are considered usable and drop into a discharge chute. The accepted parts are fed on to a conveyor belt with cleated members for delivery for further assembly. The rejected parts are dropped into a reject receptacle for further processing or scrapping.

8 Claims, 6 Drawing Figures

INVENTOR
Gerald R. Grafius
BY
Dominik, Knechtel & Godula
ATTYS.

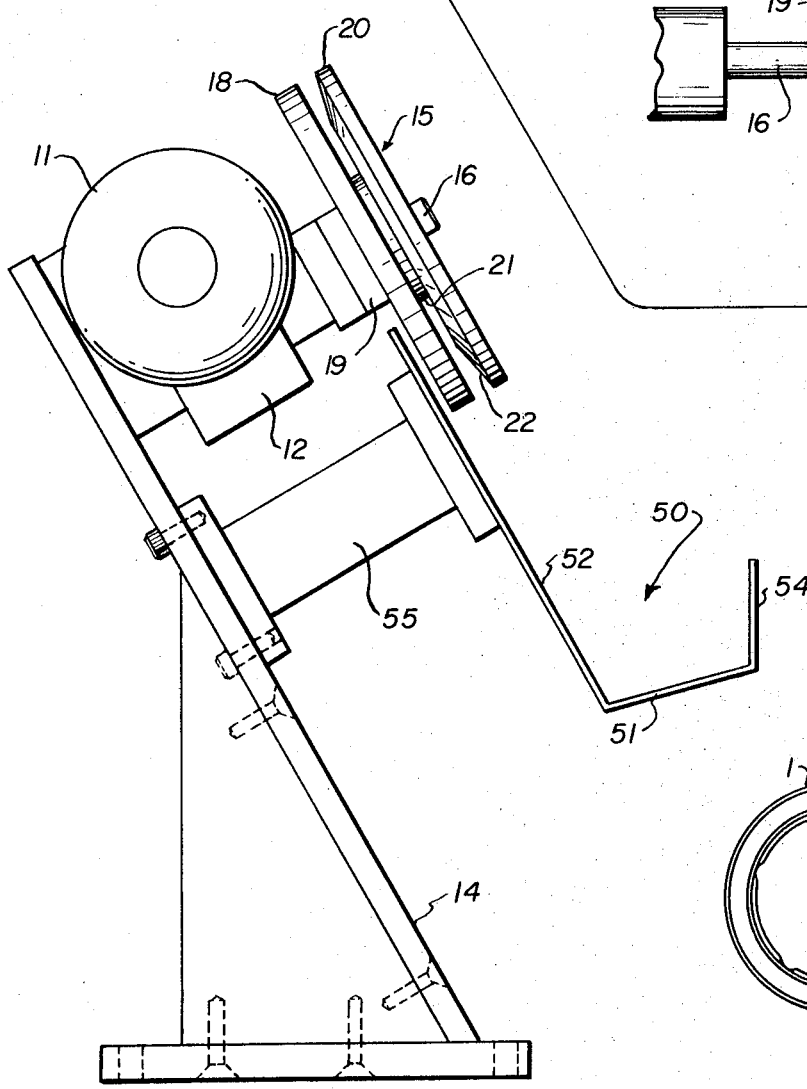
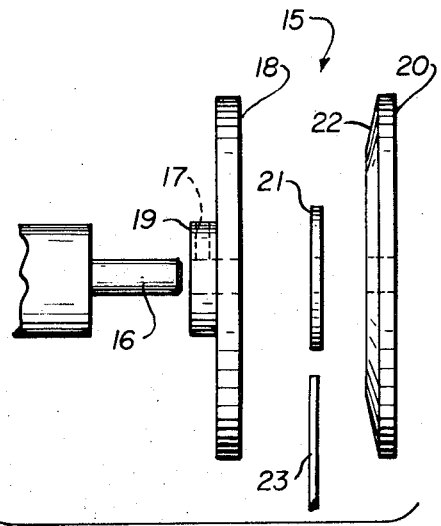
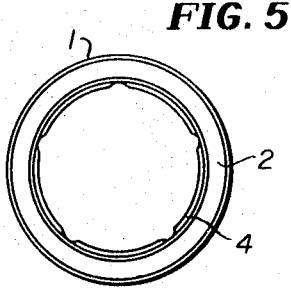
INVENTOR
Gerald R. Grafius

1

PARTS GAGER

BACKGROUND OF INVENTION

Numerous parts, and more particularly spark plug gaskets, are assembled and formed in high speed operations. Some parts are acceptable for use in further assembly operations, and some are not. In the particular embodiment shown, the gaskets can tangle, double, bend and be otherwise malformed and must be rejected or otherwise they cannot be delivered satisfactorily and accepted by further assembly equipment.

Heretofore, parallel rollers of the character shown in U.S. Pat. No. 3,313,410 have been used for parts such as headed parts, tapered parts, and the like which can gage the same as to size and functional capability. Where the reject is for reasons of tangling, doubling, bending, or malformation the part cannot be readily rolled on its edge to roller-type gaging members. Furthermore, a bent part will pass through rollers if the radius of the bend is greater than the radius of the rollers. Under these circumstances, the parts must be forwarded to a gaging member under a positive feed, and the engaging member must be capable of rejecting those parts unacceptable, and passing those parts which can be accepted by further assembly operations.

STATEMENT OF INVENTION

The present invention stems from the discovery that gaskets and other parts which must be rejected if tangled, doubled, bent or malformed can be fed readily in a feeder to a rotating gaging wheel. The gaging wheel has a wedge-like peripheral acceptance area into which the malformed or unacceptable parts are driven and the same are carried by the wheel for discharge to a reject chute. Those parts which are acceptable will not wedge into the gaging wheel, but rather drop or otherwise be fed to an acceptable parts discharge.

DESCRIPTION OF DRAWINGS

Further objects and advantages as well as a detailed understanding of the subject invention will be appreciated taken in conjunction with the accompanying illustrative drawings in which:

FIG. 3 is a front elevation of the gaging wheel and motor, their support, and the accepted parts chute.

FIG. 4 is an exploded view of the gaging wheel and drive shaft of the motor.

FIG. 5 is a plan view of a gasket characteristic of the type of part gaged and sorted by the subject device.

FIG. 6 is a front elevation of the gasket shown in FIG. 5.

Figure 1:
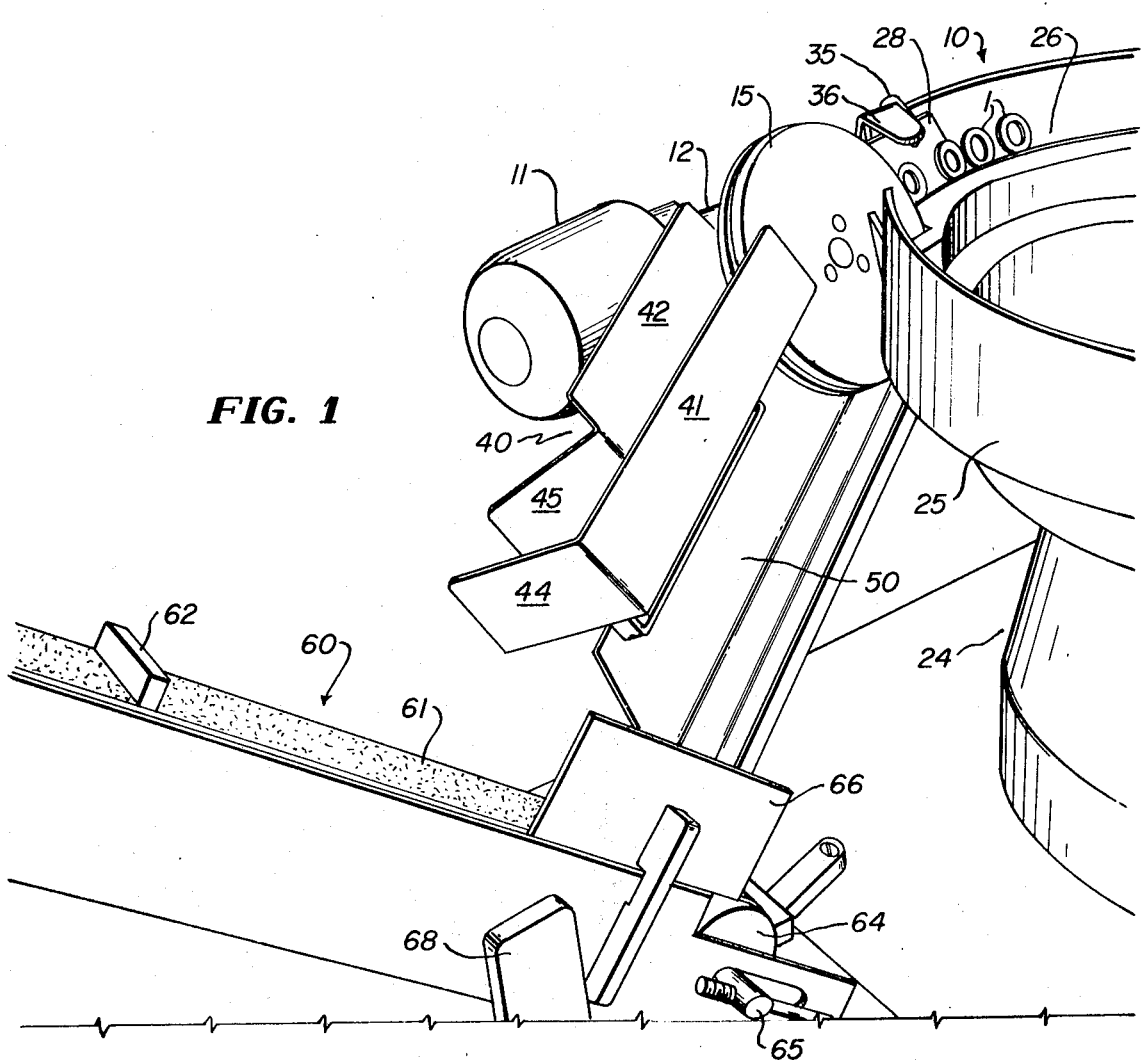
FIG. 1 is a perspective partially broken view of the entire assembly of the parts gager showing all of the elements in their general functional relationship.

The general subject of the parts gager 10 is illustrated in FIG. 1 where it will be seen that a bowl feeder 24 and its bowl 25 carry a bowl track 26 for the feeding of gaskets 1 to a gaging wheel 15. The acceptable gaskets 1 drop downwardly after they are not fed to the gaging wheel 15, and move along an accepted parts chute 50 to a magnetic conveyor 60 and are carried to subsequent assembly operations. Those gaskets 1 which are rejected are carried over the top of the circumference of the gaging wheel 15, and drop into a reject chute 40 for delivery into any convenient receptacle or other receiving means for the rejected parts. Here it should be noted, particularly as identified in FIG. 1, that the center line of the gaskets 1 must be oriented above the center line or axis of rotation of the gaging wheel 15. If the center line of the parts is the same as the center line or axis of rotation of the gaging wheel 15, the parts may not be readily fed into the gaging wheel 15 and thus occasion blockage of the entire sorting operation.

To further understand the particular part involved, by reference to FIG. 5 it will be seen that the gasket 1 has an annular rim 2 which, in turn, is formed in the configuration of a compression bellows 3. Seat locks 4 extend or are punched outwardly and downwardly from the annular rim 2, and in the conventional spark plug, the seat lock is the part that engages the base mounting rim of the spark plug itself.

Referring now to FIG. 3, it will be seen that the entire unit is driven by a motor 11 which in turn activates a gear reducer 12 to drive a drive shaft 16. Conventionally and desirably the speed reducer should be so calculated with the part shown to operate approximately 75 rp.

The drive shaft 16, as shown in FIG. 4, extends from the motor 11 and secured thereto is the gaging wheel 15, the mounting collar 19 of which slides over the drive shaft 16, and is secured in place by means of a set screw 17 which may be secured to a flat, recess, or receiving means on the drive shaft 16. The fixed wheel plate 18 has a generally planar inner face, and is separated from the lead plate 20 my means of a spacer gage plate 21.

A frustoconical face or wedge face 22 is provided on the lead plate 20 as will be more fully described hereinafter. Particularly to be noted is the stripper finger 23 which is positioned at the discharge portion of the gaging wheel 15 to positively remove any parts or gaskets 1 which have become wedged into the gaging wheel and will not readily drop off after passing over top center when rotated.

Figure 2:
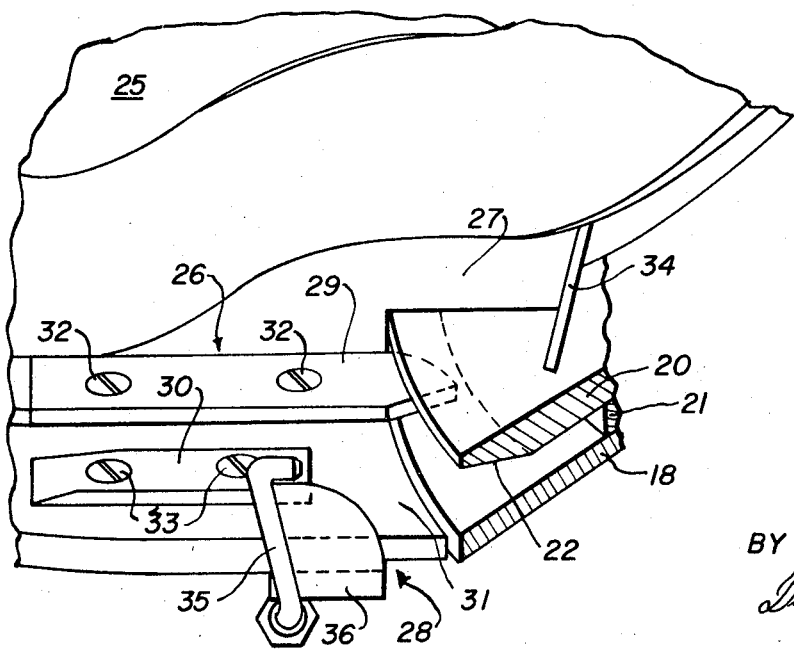
FIG. 2 is a top view of the discharge block and related elements, partially shown in section and enlarged scale, taken from the elevation identified by "FIG. 2" at the upper portion of "FIG. 1."

The feeding operation will, in detail, be better understood by reference to FIG. 2 where it will be seen that the parts, or gaskets 1, proceed from the bowl 25 through the bowl track 26 which are made up of the inner rail 29 and deflector 30 to deliver the parts forwardly. The deflector 30 is tapered or otherwise disfigured at lead portion so that any parts which are doubled will be tilted to a position of instability and dropped back into the bowl 25. These parts as well as the recirculating parts in the bowl are fed back into the delivery track 26 and assisted by means of the wheel clearance fairing 27.

When a part passes the deflector 30 and is continually guided by means of the inner rail 29 and main plate 31 of the track 26, the accellerating jet 35 delivers a jet of air to the rear portion of the part 1, and the same is accellerated into the gaging wheel 15. The jet 35, as will be noted in both FIGS. 1 and 2 is secured to the bowl track by means of mounting plate 36. As will be particularly seen in FIG. 2, after the part has been accelerated by means of the jet 35, it is directed toward the wedge face 22 of the lead plate 20. Those parts which are bent, or oversized, or otherwise disabled will, as a result of the action of the feed and the accelerating jet 35 wedge in place between the fixed wheel plate 18 and the wedge face 22 and be carried by means of the gaging wheel 15 in a direction as shown in FIG. 1 until the same are dropped into the reject chute 40. Those parts which are dropped into the reject chute 40 are confined by means of the chute wall 41 and the short chute wall 42 and then dropped to the lower end of the chute where they are turned sideways by means of the side delivery end plate 44 and the side delivery inner plate 45. As previously commented, and as shown only in FIG. 4, any parts 1 which are wedged too tightly between the fixed wheel plate 18 and the wedge face 22 of the lead plate 20 are removed by means of the stripper finger 23, and then continue of their own weight or accelerated by means not shown such as a jet, or vibratory means to the end of the reject chute 40.

As shown in FIG. 3, it will be seen that the motor 11 and its associated gear reduction 12 are mounted by means of a motor mount 14 which also, through the bracket 55, is used to mount the accepted part chute 50. The accepted part chute 50 has a base 51, a deflector wall 52, and a retaining rail 54. Those parts which do not wedge into the gaging wheel 15, drop down at the end of the track 26 or discharge block 28 onto the deflector wall 52 and thence right along the base 51 of the accepted parts chute until, as shown in FIG. 1, the same drop onto the magnetic conveyor 60. The magnetic conveyor 60 includes a magnetic belt 61 which has a plurality of cross cleats 62. The tension of the belt and its operation is controlled in part by the adjustable tension pulley 64 through the tension adjustment means 65. A further deflector plate 66 is provided to ensure that the parts or gaskets 1 do not drop off to the side of the magnetic conveyor 60, but rather are confined as they move down the accepted part chute 50 for ensured delivery to the magnetic belt 61.

Details such as the type of mounting support 68 used on the magnetic conveyor 60, the screws 32 and 33 for securing respectively the inner rail 29 and deflector 30 to the discharge block 28 may be varied within the scope of the present invention. More specifically as to a commercial embodiment, the particular spark plug gasket 1 which was fed was in a bowl having a 24 inch diameter. However, bowls of 16 to 30 inches may also be employed by adjusting sizes and proportion. The particular gasket maximum thickness is 0.105 inches. The slot in the gage wheel was 0.113 inches allowing for some oversized parts to pass through. The wheel may very well have been closed down so that any parts over 0.105 inches would be rejected; however, in the particular part concerned it was determined that those parts which operated with a 0.113 inch slot were acceptable.

The feed rate from the discharge of the parts gager have been at the rate of 120 pieces per minute. This is a delivery rate of approximately 8 feet per minute for the particular gasket shown. Variations in the above feed rates, gasket sizes, or part sizes are contemplated as within the scope of the present invention as well as the taper of the wedge face 22 and the spacing by means of the spacer gage plate 21.

Further illustrating the advantage of the invention, once the gaskets 1 are properly sized and sorted, they may be fed to a rotating comparable wheel which will deliver the same in timed relationship to another part, and positively feed the same into another feed.

Although several embodiments of the invention have been shown and described in full here, there is no intention to thereby limit the invention to the details of such embodiments. On the contrary, the intention is to cover all modifications, alternative embodiments, usages and equivalents of the disclosure as fall within the spirit and scope of the invention, specification, and appended claims.

I claim:

1. A parts gager for round flat parts comprising,
   - bulk feeding means delivering parts to a discharge block in radius to radius parts relationship,
   - a rotating gaging wheel,
   - said wheel having peripheral parts receiving wedging means conformed to wedge oversize or reject parts,
   - accelerating means on the discharge block to separate the lead part from its radius to radius contact with trailing parts and assist in engaging the reject part to the wedge,
   - means for rotating the wheel to carry the reject part out of the normal parts stream,
   - means for dropping the acceptable part which does not wedge in the gaging wheel,
   - delivery means for the accepted part.

2. In the parts gager of claim 1,
   - a pneumatic jet for accelerating the parts for engagement by the gaging wheel.

3. In the parts gager of claim 2,
   - said pneumatic jet being positioned to both separate the lead part and drive the same into the gaging wheel wedge and also accelerate the accepted part for dropping onto the delivery means.

4. In the parts gager of claim 1,
   - a motor drive shaft centerline in the gaging wheel positioned beneath the center of the part to be gaged along the common center line of the radius to radius parts.

5. In the parts gager of claim 1,
   - a deflector on the discharge block for tipping and recycling doubled or locked parts to prevent the same from being gaged.

6. In the parts gager of claim 4,
   - a pneumatic jet for accelerating the parts for engagement by the gaging wheel.

7. In the parts gager of claim 4,
   - said pneumatic jet being positioned to both separate the lead part and drive the same into the gaging wheel wedge and also accelerate the accepted part for dropping onto the delivery means.

8. In the parts gager of claim 4,
   - a deflector on the discharge block for tipping and recycling doubled or locked parts to prevent the same from being gaged.

* * * * *